Patented Dec. 25, 1951

2,579,500

UNITED STATES PATENT OFFICE 2,579,500

N-(PHENOXYISOPROPYL)-N-THENYL-BETA-HALO-ETHYLAMINES

James F. Kerwin and Glenn E. Ullyot, Philadelphia, Pa., assignors to Smith, Kline & French Laboratories, Philadelphia, Pa., a corporation of Pennsylvania No Drawing. Application September 2, 1950, Serial No. 183,095

6 Claims. (Cl. 260—332.5)

This invention relates to certain new chemical compounds, more particularly certain new halogen-containing amines and organic and inorganic salts thereof.

The new chemical compounds according to this invention have utility as physiologically active agents and, more particularly, have adrenolytic or sympathicolytic activity.

The new compounds according to this invention have the structure shown in the following formula:

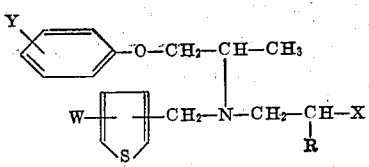

in which:

Y is a member of the group consisting of hydrogen, alkyl groups containing not more than 4 carbon atoms, hydroxy, methoxy and chlorine.

W is a member of the group consisting of hydrogen, alkyl groups containing not more than 4 carbon atoms, chlorine and bromine.

R is a member of the group consisting of hydrogen and methyl.

X is a member of the group consisting of chlorine and bromine.

Where hereinafter the symbols Y, W, R and X are mentioned, they will indicate the substituents indicated for them in connection with the above general formula.

The organic and inorganic salts contemplated by this invention include by way of example salts of the bases formed with organic acids such, for example, as glycolic, oxalic, maleic, camphorsulfonic, etc. and inorganic acids such as, for example, sulfamic, hydrochloric, hydrobromic, sulfuric, phosphoric, etc. More specifically, the inorganic and organic salts will be such as are prepared with inorganic and organic acids having an ionization constant not less than $1 \times 10^{-2}$ at 18° C.

The compounds in accordance with this invention and as identified by the above structural formula may be prepared variously by one of four general methods, from the following general description of which procedure for the preparation of all of the several compounds will be apparent to those skilled in the art.

The compounds used as starting materials for the synthesis of compounds of this invention are either known substances or, being made obvious, can be prepared by well known methods.

A propylene halohydrin or propylene oxide is added to the sodium salt of a phenol of the type

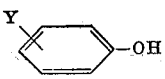

in refluxing alcohol to form the alcohol having the formula:

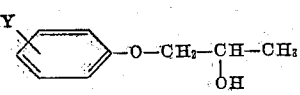

This same alcohol may also be obtained by reducing the corresponding ketone with hydrogen in the presence of a suitable hydrogenation catalyst, as, for example, platinum, palladium, or activated nickel (reference: Hurd and Perletz: J. A. C. S. 68, 38 (1946)).

The halide, formed by treating the alcohol with a suitable halogenating agent such as, for example, thionyl chloride, thionyl bromide, etc., is added to ethanolamine or isopropanolamine. When the resulting mixture is heated, the temperature employed depending upon the reactivity of the halide chosen, there is formed the N-substituted amino alcohol of the formula:

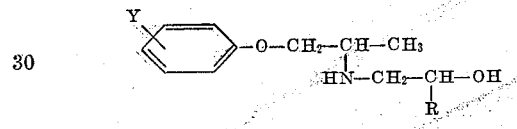

In this process it is advantageous to employ an excess of the primary amino alcohol.

The thenyl or substituted thenyl group is introduced into the molecule by heating together the secondary amino alcohol produced above with a thenyl halide or substituted thenyl halide. This may be carried out either in the presence of excess amino alcohol, or in the presence of an acid binding agent such as potassium carbonate. In most cases the reaction is conveniently carried out in a suitable solvent such as ethyl alcohol, toluene, etc., but it may be carried out without such a solvent.

Finally, the hydroxyl group of the amino alcohol

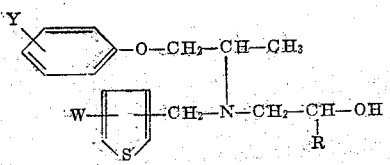

is replaced by a halogen radical X, as in the general formula above. The alcohol is reacted with a halogenating agent such as thionyl chloride or thionyl bromide to yield the product in the form of its hydrohalide salt. An excess of thionyl halide may be employed as solvent for this reaction or chloroform, benzene or other suitable solvent may be used.

The following examples will be illustrative of the various types of compounds and of specific compounds in accordance with the invention and procedure for their preparation and will, it is believed, serve to make fully apparent all of the compounds embraced by the general formula given above and the preparation thereof, respectively, it being noted that the utility indicated for the several compounds flows from the elements of the general structure common to all of them.

EXAMPLE 1

*N-phenoxyisopropyl-N-2-thenyl-β-chloroethylamine hydrochloride*

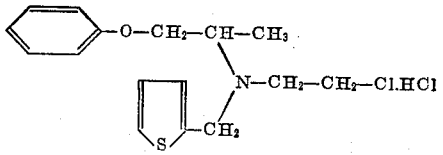

*Step 1.*—In a 500 ml. flask equipped with gas inlet tube, dropping funnel and reflux condenser is placed 139 g. of 1-phenoxy-2-propanol. A stream of dry air is bubbled through the alcohol while 55 g. of thionyl chloride is added dropwise with external cooling. The steam of dry air is continued for about six hours or until most of the hydrogen chloride has been expelled and then another 55 g. of thionyl chloride is added. The reaction mixture is allowed to stand twenty-four hours, a few drops of pyridine are added and the mixture heated four hours on the steam bath. The cooled reaction mixture is poured into water, the crude product is washed with dilute sodium bicarbonate solution and finally taken up in benzene. The benzene is distilled at ordinary pressure and the residue distilled in vacuo to yield 60–70% of 1-phenoxy-2-chloropropane, B. P. 93–94° C./5 mm.

*Step 2.*—To 494 g. of ethanolamine, heated to approximately 150° C. in a 500 ml. flask equipped with stirrer, condenser and dropping funnel, is added 465 g. of 1-phenoxy-2-chloropropane with mechanical stirring. The reaction mixture is then heated to reflux for three hours, cooled and poured into a liter of water. The organic layer is extracted into ether and the ether solution is extracted with dilute hydrochloric acid. The aqueous acid solution is then made alkaline with 40% sodium hydroxide solution and the organic base is extracted into ether. Removal of the ether leaves N-(phenoxyisopropyl)-ethanolamine which, after recrystallization from hexane, melts at 70.5–72° C.

*Step 3.*—A solution of 50.7 g. of N-(phenoxyisopropyl)-ethanolamine, 17 g. of 2-chloromethylthiophene and 100 ml. of toluene is heated slowly and finally refluxed for 2 hours. The cooled mixture is diluted with ether and filtered to remove N-(phenoxyisopropyl)-ethanolamine hydrochloride. The filtrate is shaken with 100 ml. of 5% sodium hydroxide solution, washed with water and dried over anhydrous potassium carbonate. The dried solution is filtered and distilled to give N-(phenoxyisopropyl)-N-(2-thenyl)-ethanolamine, B. P. 168–170° at 0.8 mm.

*Step 4.*—Dry hydrogen chloride is introduced into a solution of 16 g. of N-(phenoxyisopropyl)-N-(2-thenyl) ethanolamine in 75 ml. of dry chloroform until the solution is acid. Then 7.3 g. of thionyl chloride is added and the solution is heated at 50–55° C. for an hour. The solvent is removed under reduced pressure, the residue is washed with ether and then recrystallized from alcohol and ether. The N-(phenoxyisopropyl)-N-(2-thenyl)-β-chloroethylamine hydrochloride melts at 118.5–120.5° C.

EXAMPLE 2

*N-(phenoxyisopropyl)-N-(5-chloro-2-thenyl)-β-chlorethylamine hydrochloride*

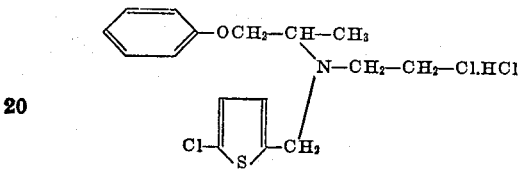

This compound will be prepared by the same procedure as described for Example 1 with 5-chloro-2-chloromethylthiophene used in place of 2-chloromethylthiophene.

EXAMPLE 3

*N-(phenoxyisopropyl)-N-(3-thenyl)-β-chloroethylamine hydrochloride*

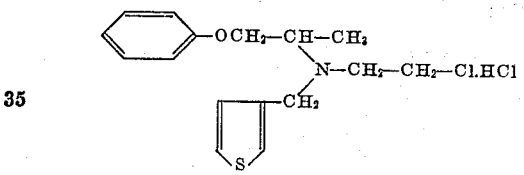

In the procedure of Example 1 an equivalent amount of 3-bromomethylthiophene will replace 2-chloromethylthiophene.

EXAMPLE 4

*N-(o-methylphenoxyisopropyl)-N-(5-methyl-2-thenyl)-β-chloroethylamine hydrochloride*

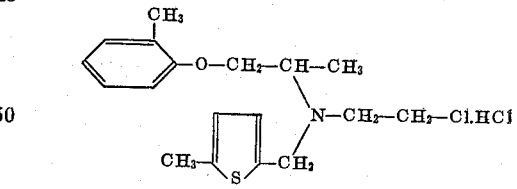

One mole of o-cresol and 300 ml. of alcohol are placed in a flask fitted with stirrer, reflux condenser and dropping funnel. A solution of 40 g. of sodium hydroxide in 40 ml. of water is added, the solution of sodium o-cresoate is heated to refluxing and one mole of propylene chlorohydrin is added with stirring over a two hour period. After the addition is complete, the reaction mixture is refluxed an additional five hours. Most of the alcohol is removed by distillation under diminished pressure, the residue is dissolved in benzene and washed several times with water and then with 10% sodium hydroxide solution. The benzene is then distilled and the residue is distilled in vacuo. 1-(o-methylphenoxy)-2-propanol distils at 86–88° C./2 mm. The p-nitrobenzoate ester melts at 95.5–96° C.

The end product is formed from 1-(o-methylphenoxy)-2-propanol as in the manner described under Example 1 by halogenation with thionyl chloride to form 1-(o-methylphenoxy)-2-chloropropane, B. P. 94–95° C./3 mm., which, in turn, is reacted with ethanolamine to form the secondary amino alcohol 1-(o-methylphenoxy-2-propyl)ethanolamine, M. P. 57.5–59° C.

The 5-methyl-2-thenyl group is introduced by heating two molar equivalents of the secondary amino alcohol with one molar equivalent of 5-methyl-2-chloromethylthiophene in refluxing toluene. The insoluble hydrochloride of the secondary amine is formed and is filtered off. N-(o-methylphenoxyisopropyl) - N - (5 - methyl - 2 - thenyl) ethanolamine is recovered by distillation.

The tertiary amine is treated with thionyl chloride in chloroform solution as described under Example 1, to form the desired end product.

EXAMPLE 5

*N-(o-sec.-butylphenoxyisopropyl)-N-(2-thenyl)-β-chloroethylamine hydrochloride*

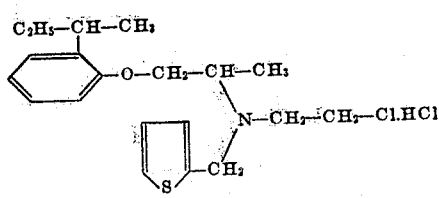

The procedure of Example 1 will be followed in the preparation of this compound, replacing the 1-phenoxy-2-propanol with an equimolar amount of 1-(o-sec.-butyl phenoxy)-2-propanol as a starting material. The halide, B. P. 118–124° C./4 mm., of this alcohol, which is formed by reaction with thionyl chloride, is reacted with ethanolamine to form the secondary amino alcohol 1-(o-sec.-butyl phenoxy)-2-propyl ethanolamine, M. P. 69.5–71.5° C.

The introduction of the 2-thenyl group is accomplished as described in Example 1, by heating two molar equivalents of the secondary amine with one of 2-chloromethylthiophene. The product is isolated by distillation and is converted into the β-chloroethyl compound by reaction with thionyl chloride in chloroform solution as described in Example 1.

EXAMPLE 6

*N-(o-isopropylphenoxyisopropyl)-N-(2-thenyl)-β-chloroethylamine hydrochloride*

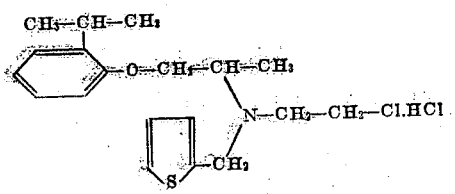

With o-isopropylphenol as a starting material in place of o-cresol, the procedure of Example 4 is followed. In the first step an alcoholic solution of the sodium salt of o-isopropylphenol is refluxed to form the ether, 1-(o-isopropylphenoxy)-2-propanol, which distills at 98° C. at 3 mm. 148 g. of thionyl chloride is added dropwise to a cooled solution of 202 g. of 1-(o-isopropylphenoxy)-2-propanol and 99 g. of pyridine in 300 ml. of chloroform. The solution is then refluxed for 2 hours, poured into water and the chloroform layer separated. Distillation gives 1-(o-isopropylphenoxy)-2-chloropropane, B. P. 76–77° C. at 2 mm. The chloro compound (107 g.) is added dropwise with stirring to 94 g. of refluxing ethanolamine. The mixture is refluxed three hours, poured into water and the layers separated. The product solidifies and melts at 52–54° C. after recrystallization from hexane.

An excess of the secondary amine is heated with 2-chloromethylthiophene in toluene solution as described in Example 1. The hydrochloride of the secondary amine is removed and the tertiary amine is recovered by distillation. The final step consists of heating the tertiary amine with thionyl chloride in chloroform solution as described in Example 1.

EXAMPLE 7

*N-(p-chlorophenoxyisopropyl)-N-(5-bromo-2-thenyl)-β-chloroethylamine hydrochloride*

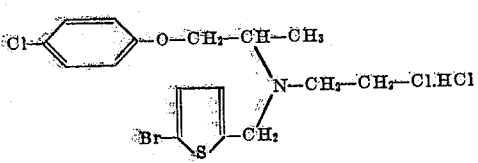

In this preparation the procedure of Example 4 will be followed using p-chlorophenol as a starting material. The p-chlorophenol is converted with sodium hydroxide to the sodium salt which is refluxed with propylene chlorohydrin to obtain the p-chlorophenoxyisopropanol, which distills at 125–130° C. at 6 mm. and forms a p-nitrobenzoate ester, M. P. 76.5–77° C.

The end product is prepared as described in Example 4 by halogenation of the p-chlorophenoxyisopropanol with thionyl chloride to form p-chlorophenoxyisopropyl chloride, B. P. 84–90° C. at 2 mm.; M. P. 37–39° C., which, in turn, is reacted with ethanolamine to form the secondary amino alcohol N-(p-chlorophenoxyisopropyl)-ethanolamine. The 5-bromo-2-thenyl group is introduced by heating the secondary amino alcohol with 5-bromo-2-chloromethylthiophene in toluene as described in Example 1. The resulting tertiary amino alcohol is then treated with thionyl chloride to produce N - (p - chlorophenoxyisopropyl) - N - (5-bromo-2-thenyl)-β-chloroethylamine hydrochloride.

EXAMPLE 8

*N-(p-methoxyphenoxyisopropyl)-N-(2-thenyl)-β-chloroethylamine hydrochloride*

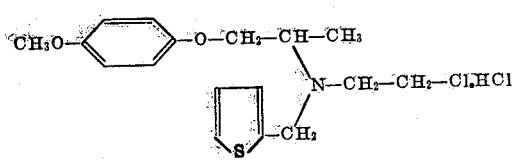

A solution of 372 g. of p-methoxyphenol, 500 ml. of alcohol, 120 g. of sodium hydroxide and 140 ml. of water is heated to reflux while 282 g. of propylene chlorohydrin is added with stirring over a two hour period. The mixture is refluxed for three hours, cooled and filtered to remove sodium chloride. Most of the alcohol is distilled at reduced pressure and the residue is dissolved in 600 ml. of benzene. The benzene solution is extracted with 10% sodium hydroxide solution, then with water and the solvent is evaporated. The solid residue is p-methoxyphenoxyisopropanol, which melts at 63–64° C. after recrystallization from benzene-petroleum ether.

A slow stream of dry air is passed into a solution of 300 g. of p-methoxyphenoxyisopropanol and 1500 ml. of dry benzene while 146 g. of thionyl chloride is added dropwise with cooling.

After six hours another 146 g. portion of thionyl chloride is added and the solution allowed to stand overnight. Three cc. of dry pyridine is then added and the solution refluxed for six hours. The cooled benzene solution is poured into water and washed repeatedly with sodium bicarbonate solution. Distillation of the solvent followed by distillation of the residue in vacuo yields p-methoxyphenoxyisopropyl chloride, B. P. 90–95° C./1 mm.

The 1 - (p-methoxyphenoxy) -2-chloropropane is reacted with ethanolamine to form the secondary amino alcohol N-(p-methoxyphenoxyisopropyl) ethanolamine, M. P. 53–55° C. The 2-thenyl group is introduced by heating a toluene solution of 2 molar equivalents of the secondary amine with one molar equivalent of 2-chloromethylthiophene. N-(p-methoxyphenoxyisopropyl) ethanolamine hydrochloride is formed and is removed by filtration. The filtrate is distilled to recover the product. The β-chloroethylamine is prepared by dissolving the tertiary amino alcohol in chloroform and adding an equimolar amount, or a slight excess, of thionyl chloride. The solution is refluxed for 2 hours, the solvent is removed and the residue is recrystallized from alcohol and ether.

EXAMPLE 9

*N-(p-hydroxyphenoxyisopropyl) -N-(3-thenyl)- β-chloroethylamine hydrochloride*

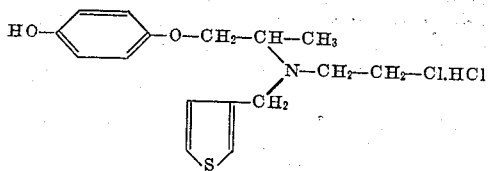

1 - (p - benzyloxyphenoxy) -2-propanol is prepared from hydroquinone monobenzyl ether and propylene chlorohydrin in the manner described in previous examples. The crude product separates from reaction mixture on cooling and is redissolved by addition of more alcohol. The 1-(p-benzyloxyphenoxy) -2-propanol, M. P. 104–105° C. is purified by recrystallization from benzene.

A chloroform solution of 1-(p-benzyloxyphenoxy)-2-propanol is treated with thionyl chloride as described for Example 4. The chloro compound is recrystallized from alcohol and melts at 67–69° C.

One hundred grams of 1-(p-benzyloxyphenoxy)-2-chloropropane is added portionwise to 66 g. of boiling ethanolamine. After three hours, the mixture is poured into water, the solid collected and recrystallized from benzene, M. P. 121–122° C.

Two molar equivalents of N-(p-benzyloxyphenoxyisopropyl) ethanolamine and one molar equivalent of 3 - bromomethyl - thiophene are heated in benzene solution for 3 hours. The hydrobromide of the secondary amine is filtered from the solution and dry hydrogen chloride is introduced into the filtrate to form the hydrochloride of N-(p-benzyloxyphenoxyisopropyl)-N-(3-thenyl) ethanolamine. This salt is treated with thionyl chloride in chloroform solution as described in previous examples. The resulting N-(p-benzyloxyphenoxyisopropyl) -N-(3-thenyl)- β-chloroethylamine hydrochloride is refluxed in 6 N alcoholic hydrochloric acid for 2 hours. This treatment removes the p-benzyloxy group and the p-hydroxy compound is recovered by concentrating the acid solution.

EXAMPLE 10

*N-(phenoxyisopropyl) -N-(5-tertiary-butyl-2-thenyl) -β-chloroethylamine hydrochloride*

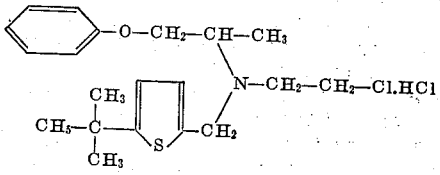

This compound is prepared in the same manner as Example 1. Instead of 2-chloromethylthiophene an equivalent quantity of 5-tertiary-butyl-2-chloromethylthiophene is employed.

EXAMPLE 11

*N-phenoxyisopropyl-N-(2-thenyl)-1-amino-2-chloropropane hydrochloride*

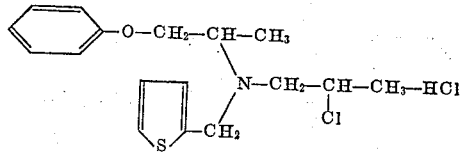

In the preparation of this compound 1-phenoxy-2-chloropropane is reacted with isopropanolamine instead of ethanolamine under the conditions described in Example 1. The resulting secondary amino alcohol, B. P. 120–125° (3 mm.) is heated with 2-chloromethylthiophene in toluene solution as described in Example 1. Treatment with thionyl chloride in chloroform solution replaces the hydroxy group to form N-phenoxyisopropyl-N-(2-thenyl)-1-amino-2-chloropropane hydrochloride.

EXAMPLE 12

*N - phenoxyisopropyl - N - (2 - thenyl) -β-bromoethylamine hydrobromide*

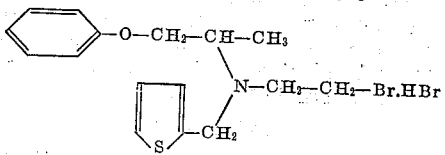

N-phenoxyisopropyl-N-(2-thenyl) ethanolamine, an intermediate in the preparation of Example 1, is heated in chloroform solution with thionyl bromide for one hour. The solvent is removed and the residue is recrystallized from alcohol and ether.

EXAMPLE 13

*N-phenoxyisopropyl - N-(3-thenyl) - β - bromoethylamine hydrobromide*

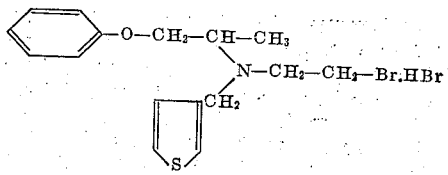

N-phenoxyisopropyl - N - (3 - thenyl) ethanolamine, an intermediate in the preparation of Example 2, is heated in chloroform solution with thionyl bromide as described in previous examples. The solvent is removed and the product is recrystallized from alcohol and ether.

In the foregoing examples hydrochlorides and hydrobromides according to this invention are exemplified. However, it will be understood and readily appreciated by those skilled in the art that the foregoing examples will illustrate the structure of organic or inorganic salts generally and will serve as specific examples of those organic and inorganic salts heretofore mentioned specifically by the writing in the several foregoing illustrative structures of the chemical symbols for the several acid groups heretofore specifically mentioned or of the acid group of any other desired organic or inorganic acid for the HCl or HBr in the several foregoing examples, respectively.

It will similarly be self-evident to those skilled in the art that in the foregoing examples illustrative of the production of chloride hydrochlorides by the procedures described, bromide hydrobromides will be produced with the use, for example, of thionyl bromide in place of thionyl chloride in the final step. Thus, the foregoing specific examples of chloride hydrochlorides serve as specific examples of bromide hydrobromides by simply replacing Cl.HCl in the several formulae with Br.HBr.

The foregoing examples illustrate the salts contemplated by this invention. The bases contemplated by this invention according to the broad and more particular structural formulae herein disclosed are specifically exemplified as will be obvious to anyone skilled in the art by reference to the foregoing specific examples with the removal from the structures illustrated thereby of the acid group, i. e., HCl or HBr.

As will be apparent, the organic and inorganic salts contemplated by this invention will be prepared from the bases in a manner usual and well known to those skilled in the art, as by neutralizing the bases with organic or inorganic acids.

The bases contemplated by this invention will be formed by carefully interacting the salts contemplated by this invention and herein exhaustively exemplified with one molecular equivalent of a strong alkali such, for example, as sodium hydroxide, potassium hydroxide, lithium hydroxide, or the like, in aqueous solution say, for example, a 1–10% solution at room temperature or below and the bases so liberated are isolated with the aid of a water-immiscible solvent such as ether or benzene.

The compounds contemplated by this invention will be variously optically inactive or optically active and it will be understood that the optically inactive and optically active forms of the compounds contemplated by this invention are all included within the scope of this invention.

The various types of compounds having the structure embodying this invention as illustrated by the above specific examples and examples of the various types of compounds will be readily prepared by the general methods of preparation described above as exemplified by the description of the preparation of the several specific examples. The starting material for the preparation of any given compound within the structure contemplated by this invention will be found among known compounds, or, its structure being obvious with reference to any particular compound desired to be prepared, will be readily prepared by known methods.

This application is a continuation-in-part of application filed by us Serial No. 97,926, filed June 8, 1949, now abandoned.

What is claimed is:

1. A compound of the class consisting of a free base and its acid addition salts, the free base having the formula:

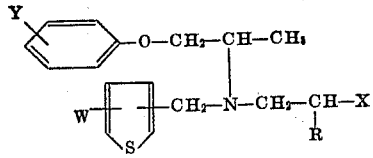

in which Y is a member of the group consisting of hydrogen, alkyl groups containing not more than 4 carbon atoms, hydroxy, methoxy and chlorine; W is a member of the group consisting of hydrogen, alkyl groups containing not more than 4 carbon atoms, chlorine and bromine; R is a member of the group consisting of hydrogen and methyl and X is a member of the group consisting of chlorine and bromine.

2. The compound having the structure:

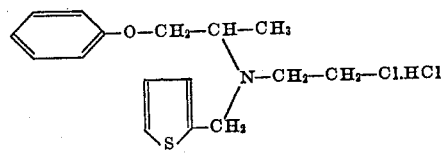

3. The compound having the structure:

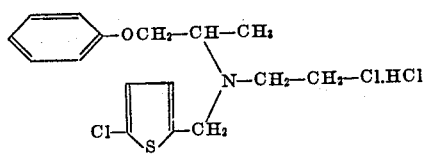

4. The compound having the structure:

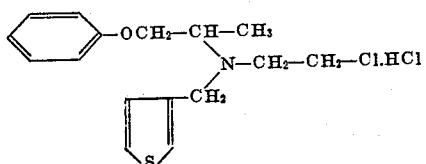

5. The compound having the structure:

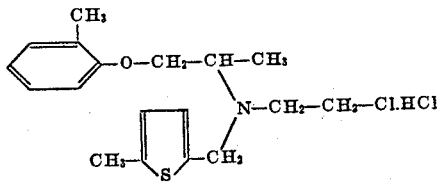

6. The compound having the structure:

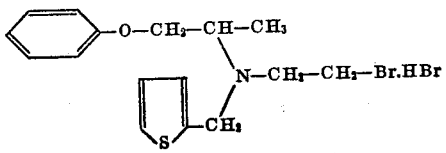

JAMES F. KERWIN.
GLENN E. ULLYOT.

No references cited.